April 4, 1950      J. D. BENNEK      2,502,816
MINNOW HOLDER
Filed March 31, 1949
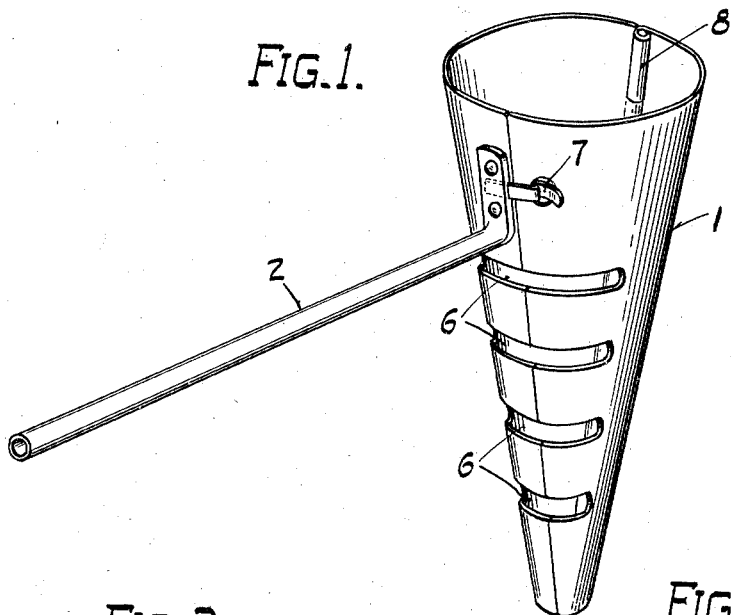
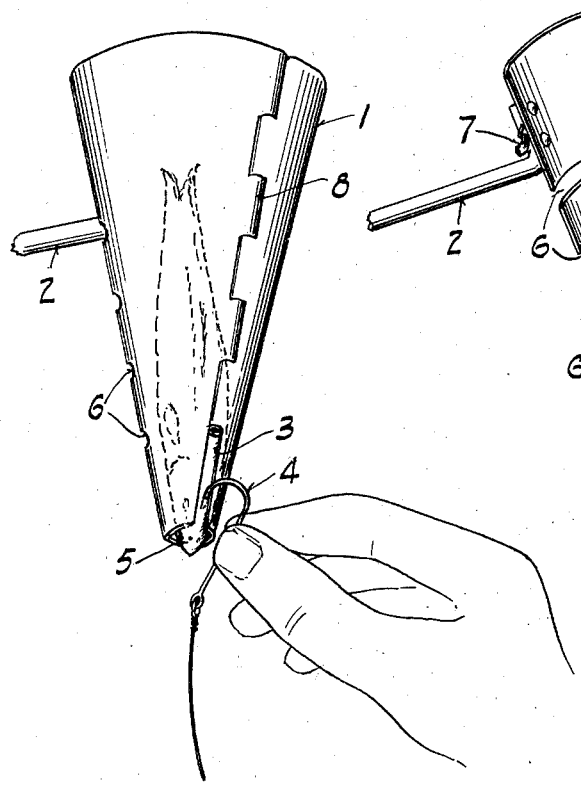
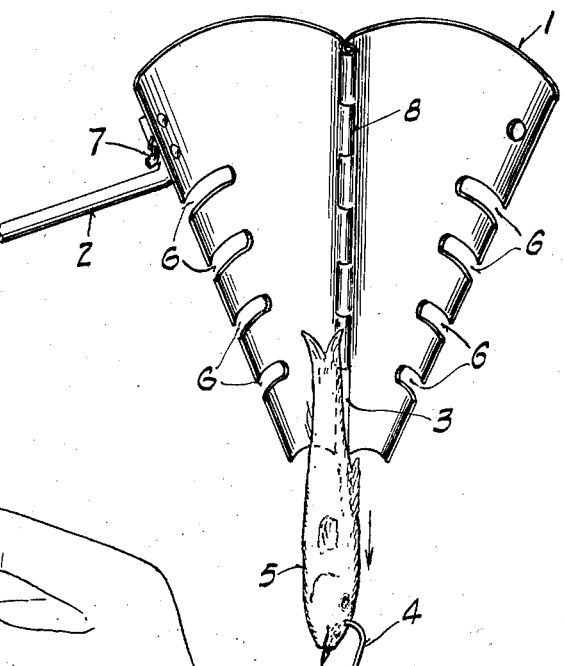
INVENTOR.
John D. Bennek
BY Andrus & Sceales
ATTORNEYS.

Patented Apr. 4, 1950

2,502,816

UNITED STATES PATENT OFFICE 2,502,816

MINNOW HOLDER

John D. Bennek, Milwaukee, Wis.

Application March 31, 1949, Serial No. 84,552

7 Claims. (Cl. 43—4)

This invention relates to a holder for holding a minnow or other small fish while baiting the same to a hook.

The principal object of the invention is to provide a holder for lifting a minnow from a minnow pail or other container and confining the same during baiting of the minnow to a hook to completely eliminate contact of the fish by the hands of a fisherman.

Another object is to provide a holder for confining a small fish during baiting from which the fish is readily released after the baiting operation is completed.

A further object is to provide a minnow holder of a shape facilitating easily catching and confining a minnow therewith.

The invention in general is directed to a container of a shape to receive and confine a minnow or other small fish with slots therein exposing portions of the fish for hooking into the same and which opens radially to release the fish after the hook baiting operation is completed.

Other objects of the invention will appear hereinafter in connection with the drawing illustrating an embodiment of the invention.

In the drawing:

Figure 1 is a perspective view of the holder of the invention;

Fig. 2 is a perspective view showing a fishing hook being inserted into the head of a minnow; and Fig. 3 is a view showing the holder in an open position to release the minnow from the holder.

The holder for holding small fish, generally termed minnows, comprises an open ended container 1 of an inverted cone shape with the upper end of a generally large diameter to facilitate catching a minnow by dipping of the holder into the water wherein the minnow is confined and the lower end of a diameter about the size of the head of the minnow to be caught. The handle 2 is secured to the upper end of container 1 and may be of a substantial length to facilitate dipping the holder into a minnow pail or the like. The fish is confined in the holder with its head down so that the fish is unable to jump from the holder once it is trapped therein.

The inverted cone-shaped container 1 is provided with a plurality of slots for baiting the fish onto a fishing hook once it is confined. A longitudinally extending slot 3 in the lower end of the body of the container merges into the open end of the small end of the container and as illustrated in the drawing the hook 4 is inserted through slot 3 into the head of minnow 5 shown as confined in the container.

Also a plurality of longitudinally spaced slots 6 extend transversely of the container for a substantial extent to facilitate inserting a hook into engagement with the body of the minnow such as the hook 4. In the drawing four slots 6 are shown. Similar slots may also be provided oppositely to slots 6 and another longitudinally extending slot may be provided opposite slot 3.

Container 1 is separated longitudinally on opposite sides into two parts. The spring latch 7 near the top holds the parts together on one side and the longitudinally extending hinge 8 is provided on the side opposite latch 7.

Latch 7 operates to hold the container 1 together when a minnow is caught and hooked and is easily unlatched by the operator after the hooking of the minnow is completed for separation of the parts of the container to open them on hinge 8 for release of the hooked minnow from the container.

The minnow holder of the invention provides a device for catching and then confining a minnow while it is being hooked. The life of a minnow appears to be substantially decreased if it is held by the hands. The holder entirely eliminates this necessity.

The various slots provided in the body of the container permit the fisherman to insert the fishing hook into the portion of the minnow he desires to hook.

The container is provided in various sizes but the inverted cone shape is desirable as the minnow is caught readily by means of the larger diameter end but is confined against jumping out once the head of the minnow is confined in the smaller end of the container.

The minnow is readily released after the fishhook has been inserted.

Various embodiments of the invention may be employed within the scope of the accompanying claims.

I claim:

1. A holder for a generally small size fish comprising an open ended container, means to confine a fish therein, said container having a plurality of slots extending through the container and exposing various portions of the fish for engaging the same with a fishing hook, and means to release the fish from the container.

2. A holder for a generally small size fish comprising an open ended container of a diameter at one end to confine a fish, said container having a plurality of slots extending longitudinally and transversely of the container and exposing various portions of the fish for engaging the same with a fishing hook, and means to release the hooked fish from the container.

3. A holder for a generally small size fish comprising an open ended container of two parts of a diameter at one end to confine the fish and of a diameter at the other end to catch and entrap the fish therein, said container having a plurality of slots extending longitudinally and transversely of the container and exposing various portions of the fish for engaging the same with a fishing hook, a longitudinally extending hinge holding the two parts of the container together on one side, and a latch holding the parts of the container together on the other side, the latch when released providing for opening of the container on its hinge to release the fish hooked therein.

4. A holder for a generally small size fish comprising an inverted conical-shaped container of two parts of a diameter at one end to confine the fish and of a diameter at the other end to catch and entrap the fish therein, a longitudinally extending hinge holding the two parts of the container together on one side, a latch holding the parts of the container together on the other side with the latch when released providing for opening of the container on its hinge to release the fish confined therein, a longitudinal slot extending from the small end of the container to expose the head of the fish for hooking the same, said container having a plurality of slots therein for exposing the body of the fish for hooking the same, and a handle secured to the upper end of the container to facilitate dipping the container into water to entrap and catch the fish to be hooked.

5. A holder for a generally small size fish comprising an inverted conical-shaped container of two parts of a diameter at one end to confine the fish and of a diameter at the other end to catch and entrap the fish therein, said container having a plurality of slots extending longitudinally and transversely of the container for exposing various portions of the fish for engaging the same with a fishing hook when the fish is confined therein, a longitudinally extending hinge holding the two parts of the container together on one side, and a latch holding the parts of the container together on the other side, said latch when released providing for opening the container on its hinge to release the fish contained therein.

6. A holder for a generally small size fish comprising an inverted conical-shaped container of a diameter at one end to confine the fish, said container having an opening extending longitudinally from the apex for exposing a portion of the fish for engaging the same with a hook, and means to release the hooked fish from the container.

7. A holder for a generally small size fish comprising an inverted conical-shaped container of two parts of a diameter at one end to confine the fish and of a diameter at the other end to catch and entrap the fish therein, a longitudinally extending hinge holding the two parts of the container together on one side, and a latch holding the parts of the container together on the other side with the latch when released providing for opening the container on its hinge to release the fish contained therein, said container having an opening extending from the parting line on one side of the container to expose the fish for hooking the same when the container is closed.

JOHN D. BENNEK.

REFERENCES CITED

The following references are of record in the file of this patent:

UNITED STATES PATENTS

| Number | Name | Date |
| --- | --- | --- |
| 115,374 | Sohier | May 30, 1871 |
| 731,335 | Blanchet | June 16, 1903 |
| 933,817 | Beatty | Sept. 14, 1909 |
| 2,458,671 | Zirbel | Jan. 11, 1949 |